UNITED STATES PATENT OFFICE.

CLARENCE P. ROBINSON, OF SWARTHMORE, PENNSYLVANIA, ASSIGNOR TO E. I. DU PONT DE NEMOURS & COMPANY, OF WILMINGTON, DELAWARE, A CORPORATION OF DELAWARE.

CLEANING AND POLISHING COMPOSITION.

1,307,149.     Specification of Letters Patent.     Patented June 17, 1919.

No Drawing.     Application filed July 3, 1918. Serial No. 243,113.

*To all whom it may concern:*

Be it known that I, CLARENCE P. ROBINSON, of Swarthmore, in the county of Delaware and in the State of Pennsylvania, have invented a certain new and useful Improvement in Cleaning and Polishing Compositions, and do hereby declare that the following is a full, clear, and exact description thereof.

My invention relates particularly to compositions adapted to be used for cleaning and polishing of various materials.

The object of my invention is to provide a composition for removing grease, dirt and foreign matter of all kinds from the skin, as well as from metals and many other kinds of materials. The object of my invention is particularly to provide a composition of this character which contains a finely divided prepared wood product, as well as a soap. The wood contained in the composition serves to enter the interstices of the surface being cleaned, so as to forcibly remove accumulations from the same, but without injury to the surface being treated.

The object of my invention is, furthermore, to provide a composition of the above character in the form of a powder which has the advantageous characteristics of being able to remove the insoluble dirt from the interstices of the skin or other surfaces, without injury to, or scratching the same, which is capable of taking up the insoluble dirt when loosened from the surface, and which is capable of emulsifying and absorbing the oily materials found on the surface to be cleaned.

More particularly the object of my invention is to provide a composition of this character in which the disadvantageous characteristics of previous compositions which result from the presence of objectionable oils, resins, etc., and lack of absorbent qualities, as well as either deficient abradant properties or tendency to produce scratching, are avoided.

Further objects of my invention will appear from a detailed description thereof contained hereinafter.

While my invention is capable of embodiment in many different forms, for the purpose of illustration I shall describe only certain forms of my invention hereinafter.

For example, a composition made in accordance with my invention may be comprised of:

Alkali free soap powder_____ 20 to 40 parts.
Prepared wood_____ 60 to 80 parts.

The production of the prepared wood used in connection with my invention is an important feature thereof. To produce the prepared wood, I utilize saw-dust from fir or spruce, which saw-dust has become seasoned by standing in the air for a considerable period, which may be several years. This sawdust is ground to a fine powder between steel cylinders, such as are used in flour mills. The ground saw-dust is then screened, and thereafter boiled in water for $\frac{1}{2}$ or more hours, in order to remove a considerable proportion of the objectionable oils and resins. The wood is then introduced into a centrifuge and dried at a temperature of 50° to 60° C. When prepared in this manner, the wood does not as yet have the desired scrubbing and absorbing properties, but must be allowed to age for a month or longer, in order to acquire the desired abradant and absorbing qualities. The soap used in the above composition may be any suitable soap powder, and may, for example, be made of a soda soap.

While I have described my invention above in detail, I wish it to be understood that many changes may be made therein, without departing from the spirit of my invention.

I claim:

1. A cleaning and polishing composition comprising a soap powder and a finely divided prepared wood having had oils and resins removed therefrom.

2. A cleaning and polishing composition comprising a soap powder and a finely divided prepared boiled wood having had oils and resins removed therefrom.

3. A cleaning and polishing composition comprising a soap powder and a finely divided prepared, boiled and dried wood having had oils and resins removed therefrom.

4. A cleaning and polishing composition comprising a soap powder and a finely divided prepared, boiled, dried and aged wood having had oils and resins removed therefrom.

In testimony that I claim the foregoing I have hereunto set my hand.

CLARENCE P. ROBINSON.

Witnesses:
P. E. STRICKLAND,
H. L. BRADLEY.